Patented Oct. 12, 1937

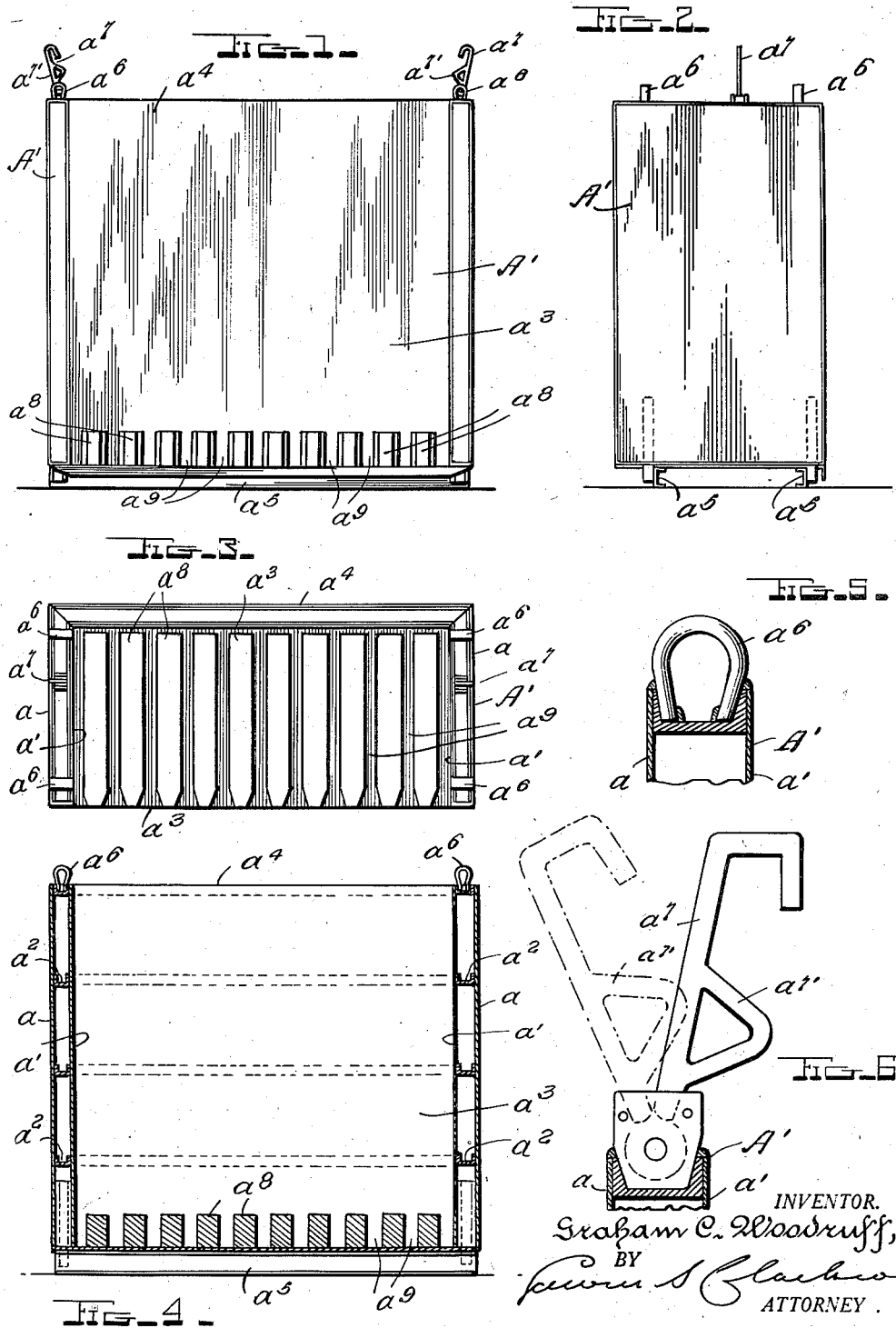

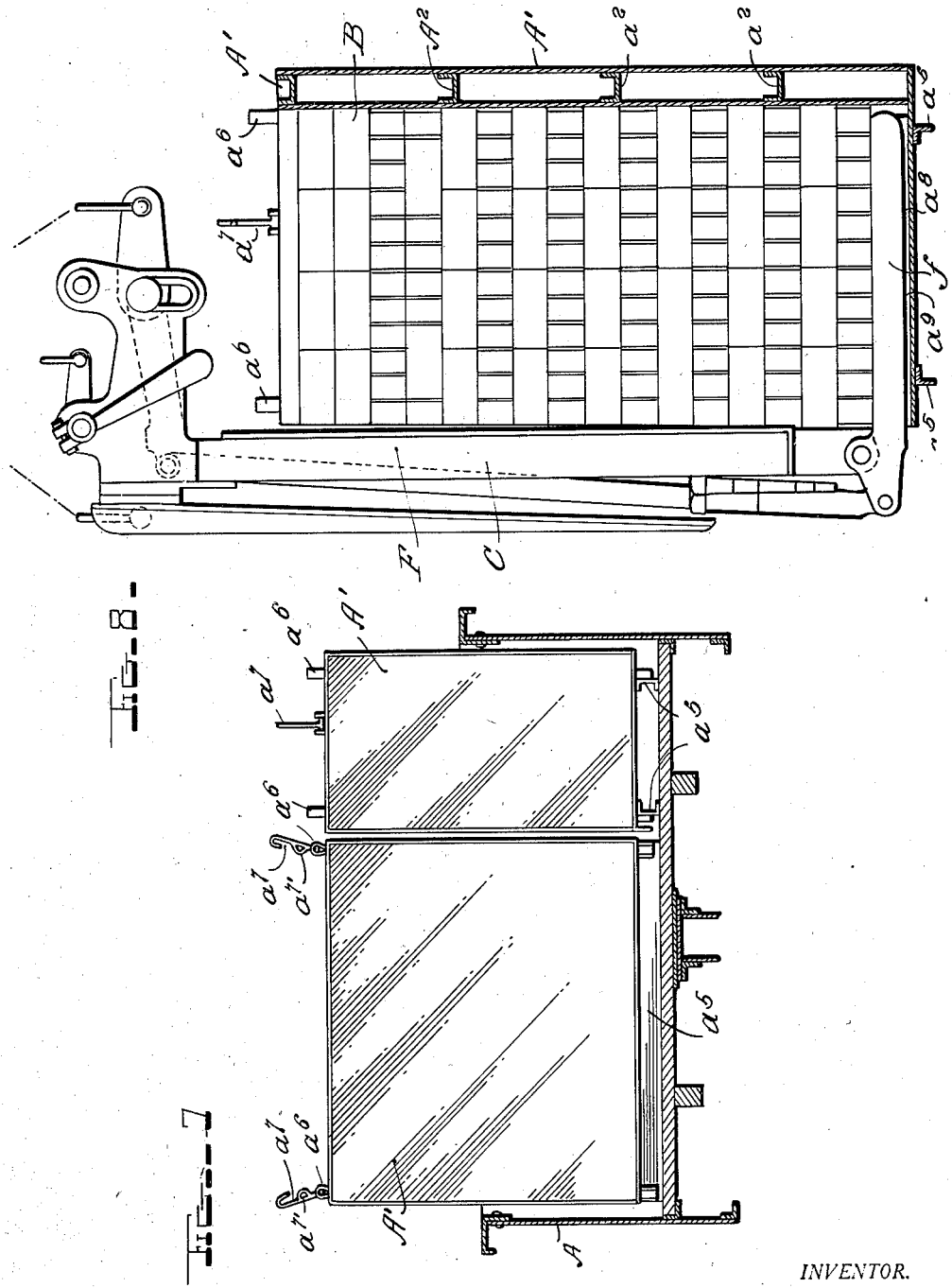

2,095,515

UNITED STATES PATENT OFFICE 2,095,515

CONTAINER FOR TRANSPORTING STACKED COMMODITIES

Graham C. Woodruff, Bronxville, N. Y., assignor to The L. C. L. Corporation, a corporation of Delaware Original application March 21, 1935, Serial No. 12,294, now Patent No. 2,061,495. Divided and this application December 31, 1935, Serial No. 57,042

3 Claims. (Cl. 294—62)

This invention relates to a new and improved construction of container for transportating common brick, face brick, hollow tile or other like commodities of known size which are commonly transported in stacks or large quantities at a time in railway cars or other transport vehicles, and the present application is a division of my prior application Serial No. 12,294, filed March 21, 1935, Patent No. 2,061,495.

One object of the invention is to provide a container whereby a quantity of brick or other articles in tier or stack form may be loaded as a unit, transported with other like units, and unloaded as a unit, so that the original stack or tier form of the unit may be preserved and delivered in such form at a destination point.

A further object of the invention is to provide a novel construction of container whereby stack or tier units of brick or other articles may be stored for transportation in container freight cars, so that the stack or tier units may be kept in separated condition and from relative movement, shifting or collapse during transportation on the car.

A still further object of the invention is to provide a container whereby brick in tier or stack form as it comes from a drying kiln may be directly loaded in the container for transport in a container car to a destination point for removal and disposition in stack form until their use is desired for building construction or other purpose.

A still further obect of the invention is to provide a container whereby such stack or tier units of brick or other articles may be readily loaded into containers on a container car and unloaded therefrom into containers on another transport vehicle in a ready, convenient and time saving manner.

A still further object of the invention is to provide a container whereby brick or other articles in stack or tier units may be loaded, transported and unloaded with a material saving of time and labor over prior methods, without liability of fracture or other damage to the articles and so as to avoid the losses resulting therefrom, and in such manner as to effect great economy in handling and transporting the articles and in enabling a greater quantity of articles to be carried at a time on a container car or other carrier vehicle.

A still further object of the invention is to provide a novel construction of container which may be loaded and unloaded by the use of a lifting fork or other mechanical means while on a vehicle, loading and unloading platform or other support, or one or more of which in loaded condition may be lifted onto or off a car, platform or other support after being loaded in any suitable manner, and whereby one or more loaded containers may be lifted off a car, loading platform or other support and unloaded by dumping action if desired.

With these and other objects in view, the invention consists in the novel construction, combination and relationship of parts hereinafter more fully described and claimed, reference being had to the accompanying drawings, in which:—

Fig. 1 is a front elevation of one of the containers.

Fig. 2 is an end elevation thereof.

Fig. 3 is a top plan view of the container.

Fig. 4 is a cross-section through the container.

Figs. 5 and 6 are detail views showing the construction of the lifting links and hooks on a container.

Fig. 7 is a transverse section through the car showing the arrangement of containers of the longitudinal and transverse sets therein.

Fig. 8 is a sectional view through a container showing in side elevation the lifting fork and illustrating its application in applying a stack of brick to or removing a stack from the container.

Each container A' comprises a body, preferably of oblong rectangular form, and having a bottom wall or floor structure, a rear wall and two end walls, said rear and end walls being made of spaced outer and inner sheets $a$, $a'$ connected and held spaced by channeled or other suitably shaped spacing and stiffening members $a^2$. The container as thus constructed is open at its front $a^3$ and its top $a^4$ and is provided at its bottom with supporting members or feet $a^5$ for supporting the container upon the floor of the car and which are adapted to serve as skids or runners on which the container may be slidably shifted in the car. The end walls of the container are provided, at the top and near the corners of the container, with lifting links $a^6$ for connection with the sling of a crane, whereby the container may be swung into and out of the car and otherwise manipulated. The end walls of the container are also provided with pivotally mounted lifting hooks $a^7$ for engagement with a lifting fork for a similar purpose. Each of these hooks may advantageously be provided with an abutment projection $a^{7'}$ for the purpose of preventing any possibility of the stacked load catching on the hooks proper, when being lifted from the container by the fork, in cases where a hook has not been thrown back to the dotted non-interfering position from the full line position shown in Fig. 22. Assuming for example that any hook has not been thrown back to a non-interfering position, but remains in the interfering position shown in full lines in Fig. 22, it will be thrown back into the clear when the upper tier of brick in the stack contacts the under or sloping side of the projection $a^{7\prime}$ as the load is being lifted vertically from the container. The projection $a^{7\prime}$ does not come into play when a stack of brick is being lowered into the container, as under these conditions the hook if not thrown back out of the way will contact the underside of the lifting fork without tendency to disrupt the stack. The bottom and body walls of the container may be made of sheet steel of proper kind and gage and properly stiffened to provide a container of maximum strength and durability. The open-front and open-topped chamber of the container is adapted to receive freight or lading to be transported, herein shown in the form of a stack or tier unit B of brick. As stated, the bricks composing this stack or tier may be laid upon one another in the manner in which green brick are placed in tier or stack form on a kiln truck for drying or curing treatment in a brick kiln. The upper surfaces of the bottom of the container are provided with a series of upstanding supporting and guiding cleats or ribs $a^8$ on which the stacks of brick rest and whereby the lowermost bricks of the stack are held elevated and spaced from the bottom of the container. These cleats or ribs serve also as guide members and are properly spaced to form guideways or channels $a^9$ for the reception and movement of the fingers or tines of the lifting fork in the operation of the fork in loading a stack of brick into a container and unloading the same therefrom. The cleats or ribs may be made of wood or other suitable material. Instead of forming the container with a solid bottom wall, a perforate type of bottom may be used, i. e., one in which the cleats $a^8$ rest on metal supports spaced or otherwise constructed or arranged to leave the spaces between the cleats themselves and the cleats and the side walls open to allow broken brick and other refuse to drop through instead of accumulating in said spaces.

What I claim is:—

1. A container for transporting stacked articles comprising a container body formed of rigidly united bottom, back and side walls and open at the front and top for the insertion and removal of a stack of articles horizontally or vertically through said open front or top, spaced supporting elements secured to and extending transversely on the underside of the bottom wall between said side walls and serving to hold the container elevated above an underlying supporting surface and to brace the bottom wall, lifting elements at the top of the side walls of the container whereby the container may be connected with a lifting mechanism, and spaced stack supporting cleats extending in parallel relation between the back wall and open front of the container and resting on and secured to the bottom wall, said cleats serving to further reinforce said bottom wall and to support a stack resting thereon vertically spaced from the bottom wall, the spaces between the cleats providing guideways for the passage of the tines of a lifting fork through the open front of the container beneath the stack to allow removal of the stack thereby from the container.

2. A container for transporting stacked articles comprising a container body open at front and top and comprising rigidly united bottom, back and side walls, the back and side walls each consisting of spaced outer and inner wall sheets, channeled spacing and stiffening members disposed between and rigidly connected to the spaced wall sheets of the back and side walls at intervals between the bottom and top of the container, the uppermost spacing and stiffening members being disposed substantially flush with the upper edges of the walls to close the spaces between the sheets, and lifting elements secured to the uppermost spacing and stiffening members of the side walls and projecting above the top of the container.

3. In a container for transporting a stack of articles and comprising a body open at front and top and formed of bottom, side and end walls, lifting elements pivoted to the container at the upper edges of its side walls so as to swing inwardly and outwardly toward and from the open top of the container between inoperative and operative positions, each of said members being pivoted at its lower end to the container and provided at its upper end with a hook for engagement with a lifting device, and each of said members being provided between its pivoted and hooked ends with an inwardly extending projection adapted in the event that said member is disposed in its operative position during removal of a stack through the open top of the container to be engaged by the stack to swing the member outwardly to its inoperative position.

GRAHAM C. WOODRUFF.